United States Patent [19]

Takemoto et al.

[11] 4,322,740
[45] Mar. 30, 1982

[54] SOLID-STATE COLOR IMAGING CAMERA

[75] Inventors: Iwao Takemoto, Kodaira; Shusaku Nagahara, Hachioji; Tsutomu Fujita, Mobara; Kazuo Sato, Kodaira, all of Japan

[73] Assignees: Hitachi, Ltd.; Hitachi Denshi Kabushiki Kaisha, both of Tokyo, Japan

[21] Appl. No.: 134,285

[22] Filed: Mar. 26, 1980

[30] Foreign Application Priority Data

Mar. 30, 1979 [JP] Japan .................................. 54-36856
Jul. 6, 1979 [JP] Japan ............................. 54-92535[U]

[51] Int. Cl.³ .............................................. H04N 9/07
[52] U.S. Cl. ....................................... 358/44; 358/50
[58] Field of Search ..................... 358/50, 51, 43, 47, 358/44, 41, 11, 16, 17, 18, 52, 213

[56] References Cited

U.S. PATENT DOCUMENTS

| | | | |
|---|---|---|---|
| 3,975,760 | 8/1976 | Yamanaka | 358/50 |
| 3,982,274 | 9/1976 | Chai | 358/41 |
| 4,001,878 | 1/1977 | Weimer | 358/41 |
| 4,054,906 | 10/1977 | Yamanaka | 358/44 |
| 4,071,853 | 1/1978 | Yamanaka | 358/41 |
| 4,175,268 | 11/1979 | Ochi | 358/44 |
| 4,183,052 | 1/1980 | Yamanaka | 358/50 |

Primary Examiner—Tommy P. Chin
Attorney, Agent, or Firm—Craig and Antonelli

[57] ABSTRACT

A solid-state color imaging camera comprises three solid-state image sensors each of which has a two-dimensional array of picture elements arranged with respective predetermined pitches in vertical and horizontal directions. The first, second and third image sensors are used for green, red and blue lights. The optical positioning of the first image sensor is shifted with respect to the second and third image sensors by the half of the picture element pitch in the vertical direction.

7 Claims, 18 Drawing Figures

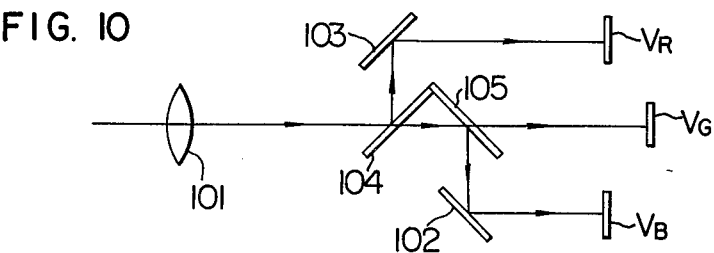
FIG. 10
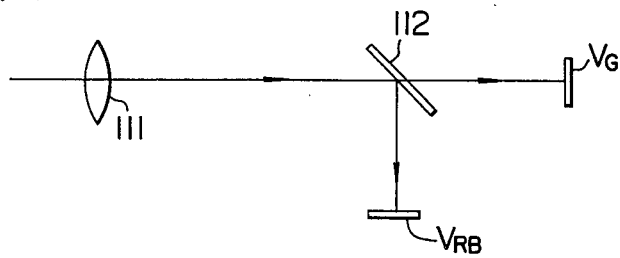
FIG. 11
FIG. 12A    FIG. 12B
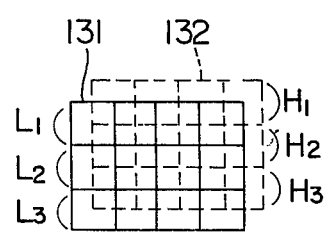
FIG. 13

SOLID-STATE COLOR IMAGING CAMERA

FIELD OF THE INVENTION

This invention relates to a solid-state color imaging camera. Particularly, it relates to a solid-state color television camera which has a plurality of solid-state image sensors.

BACKGROUND OF THE INVENTION

Solid state image sensors are classified into three groups, i.e. MOST (Insulated-Gate Field Effect Transistor) type image sensor, CTD (Charge Transfer Device) type image sensor, and CID (Charge Injection Device) type image sensor, each of these types having a specific photo-electric conversion function and scanning function required for use in image pickup devices (see Nagahara et al "MOS Type Area-Imaging Sensor and Television Camera", the Japanese journal of Electronics, April 1976, p.p. 368–372).

An MOST type solid-state image sensor, as described in the above-referenced Nagahara et al publication, will be described as an example with reference to FIG. 1.

In FIG. 1 schematically showing an MOST type solid-state image sensor, reference numeral 11 designates a horizontal scanning circuit for X-position or column addressing, numeral 12 a vertical scanning circuit for Y-position or row addressing, numeral 13 vertical switching insulated-gate field effect transistors (hereinafter referred to simply as MOSTs) which are turned on and off by vertical scanning pulses from the vertical scanning circuit 12, numeral 14 photodiodes formed by using the source junctions of the MOSTs 13, numeral 15 a vertical signal output line connecting the drains of the MOSTs 13 of the same column in common, numeral 16 horizontal scanning MOSTs which are turned on and off by horizontal scanning pulses from the horizontal scanning circuit 11, with their drains connected with a horizontal signal output line 17 and their sources connected with the vertical signal output line 15, numeral 18 a driving voltage source (i.e. voltage source for video output) connected via a resistor 19 with the horizontal signal output line 17 to drive the photodiodes 14, and numeral 20 a signal output terminal. The horizontal and vertical scanning circuits 11 and 12 respectively regulate the horizontal and vertical switching MOSTs 16 and 13 one by one and the photocurrents from the photo-diodes 14 arranged in a two-dimensional array are read out through the resistor 19. Since the respective signals from the photodiodes 14 correspond to an optical image projected thereon, the currents read out of the photodiodes provide the original video signal.

The above-described solid-state image sensor is featured in that it can use the sources of the switching MOSTs for its photo-electric conversion functions and that MOST type shift registers can be used for the scanning circuits. Accordingly, this type of solid-state image sensor can be easily fabricated with high integration and therefore realized by using MOS LSI technology, as shown in FIGS. 2A and 2B. FIG. 2A shows in cross section the structure for one picture element and FIG. 2B shows in plan view a part of the picture element arrangement. In these figures, reference numeral 23 designates a semiconductor substrate of N-type conductivity on which photo-electric conversion elements and scanning circuits are integrated, numeral 24 a well region or impurity region of P-type conductivity formed on the N-type semiconductor substrate 23, numeral 13 a vertical switching MOST having a gate electrode 25 to which the vertical scanning pulse from the vertical scanning circuit 12 is applied, numeral 26 a high impurity concentration region of N-type conductivity which serves as the source of the MOST 13 and also forms a photodiode 14 together with the P-type well region 24 with a PN junction formed therebetween, numeral 27 a high impurity concentration region of N-type conductivity which serves as the drain of the MOST 13 and is connected with one end of a conductor layer 28 as the vertical signal output line 15. The other end of the output line 28 or 15 connected with the drains of plural such vertical switching MOSTs 13 in common is connected with one end of a horizontal switching MOST 16 which is turned on and off by the horizontal scanning pulses from the horizontal scanning circuit 11 and the other end of the MOST 16 is connected with the horizontal signal output line 17. The well region 24 and the substrate 23 are usually kept at earth potential (OV). (Sometimes, the PN junction between the well region 24 and the substrate 23 may be reversely biased.) Reference numerals 291, 292 and 293 designate insulating films which usually comprise $SiO_2$.

In operation, the photodiode 14 is charged up to the video voltage $V_v$ at one scanning but it discharges by $\Delta V_v$ in accordance with the quantity of light incident thereon during the period of one field. When the associated switching MOSTs 13 and 16 are turned on at the next scanning, this discharging function is compensated by a charging current from the video voltage source 18. This charging current corresponding to the discharging function is read out through the resistor 19 connected with the video voltage source 18 so that a video signal is obtained from the output terminal 20.

Since the solid-state image sensor having a picture element structure shown in FIGS. 2A and 2B, as disclosed in U.S. Pat. No. 4,148,048 patented Apr. 3, 1979, has the P-type well region in which the photo-electric conversion element is formed, the sensor is free from blooming. Moreover, with this sensor, infrared light is almost completely absorbed in the substrate so that the resolution is prevented from being degraded, and the spectral response in the visible range has a flat or balanced characteristic so that the video signal of an object can be obtained with high fidelity. This device may be said to have greatly improved properties over any other image sensors hithertobefore reported and developed.

The other MOST type image sensor, the CTD type image sensor or the CID type image sensor may be used for a solid-state color camera, as well.

FIG. 3 schematically shows a three-chip type color camera using three solid-state image sensors. Referring to FIG. 3, light having passed through a lens 31 is decomposed into red (R), green (G) and blue (B) components by, for example, a dichroic prism 32 for color separation. The R, G and B components are focused respectively on solid-state image sensors (hereinafter referred to also as an imager) 34, 33 and 35 for the components R, G and B. The R, G and B imagers 34, 33 and 35 perform photo-electric transducing functions. In a conventional solid-state color imaging camera, the optical positioning of the imagers 33, 34 and 35 for each picture element has an exactly overlapped registeration for preventing color breakup. The resolution of the color imaging camera is equivalent to that of each of the imagers 33, 34 and 35 for white light.

In television (TV) broadcastings, one frame contains 525 horizontal scanning lines in the case of NTSC format employed in USA and Japan. The number of picture elements in the vertical direction for each imager is required to be the same as that of the horizontal scanning lines, or at least about 500 elements if some for vertical (or blanking) intervals may be omitted. As for the number of picture elements in the horizontal direction, it must be at least about 400 to obtain a content picture quality though depending upon a desired resolution. As a result, each of the imagers 33, 34 and 35 would have a large chip size corresponding to that of a memory LSI having an extremely large scale of more than 200 K bits. Further, according to the NTSC format, the ratio of the picture size in the vertical direction to that in the horizontal direction is as small as $\frac{3}{4}$, and therefore it is necessary to place a greater number of picture elements in this smaller (vertical) direction. Such an arrangement, however, is very difficult. Therefore, the size of the imager would be extraordinarily large as compared with common semiconductor LSI devices, thereby greatly decreasing the production yield and rendering the fabrication difficult. In addition, an optical system such as the dichroic prism must be correspondingly large. These lead to the lack of the predestined merits as a solid-state imaging camera or color TV camera with compactness, small weight and inexpensiveness and also prohibits the realization thereof.

The TV scanning format is an interlaced scanning in which every other horizontal scanning line is traced during one field and the remaining horizontal lines are successively traced during the next field to complete one frame. The photo-electrically converted signals derived from the imagers 33, 34 and 35 must be adapted for this scanning format. For explanation of this interlaced scanning, an imager 41 simplified to have a 6×6 picture element matrix is shown in FIG. 4.

Referring to FIG. 4, of all the horizontal rows $A_1$, $B_1$, $A_2$, $B_2$, $A_3$ and $B_3$ of picture elements 42, the rows $A_1$, $A_2$ and $A_3$ are scanned in the odd-numbered fields while the rows $B_1$, $B_2$ and $B_3$ are scanned in the even-numbered fields, according to the above-described interlaced scanning.

To achieve such a scanning, it is necessary to provide a complicated switching mechanism which performs the switching of the scanning lines for every field in the imager 41 (33, 34 and 35 in the case of the system shown in FIG. 3).

Further, according to the above scanning, signals remaining in the skipped rows $B_1 \sim B_3$ after the completion of the scanning of the rows $A_1$, $A_2$ and $A_3$ in the odd-numbered field provide a superposition effect on signals read out of the rows $B_1$, $B_2$ and $B_3$ at the next scanning in the even-numbered field, thereby generating an undesirable after-image or lag on the reproduced picture. To eliminate such an after-image, it is necessary to read out the signals from all the picture elements in every field. For this purpose, pairs of rows $A_1$ and $B_1$, $A_2$ and $B_2$, and $A_3$ and $B_3$ are successively scanned in the odd-numbered fields and different pairs of rows, for example, $B_1$ and $A_2$, $B_2$ and $A_3$ etc. are successively scanned in the even-numbered fields. Consequently, the afore-mentioned switching mechanism would be further complicated and also complicated treatment of signals would be required. Moreover, in the case of the NTSC format, the number of picture elements in the vertical direction must be as large as about 500 to cover one frame, as mentioned above.

BRIEF DESCRIPTION OF THE INVENTION

One object of this invention is to provide a solid-state color imaging camera which can be fabricated with small size and at low cost.

Another object of this invention is to provide a solid-state color imaging camera which can dispense with an interlacing mechanism.

According to this invention, there is provided a solid-state color imaging camera comprising a plurality of solid-state image sensors each of which has a two-dimensional array of picture elements arranged with respective predetermined pitches in vertical and horizontal directions, wherein the optical positioning of one of said image sensors with respect to the other image sensor is shifted by the half of the picture element pitch of the vertical direction, and the horizontal scannings in the odd-numbered and even-numbered fields for either one of said one and other image sensors are shifted in timing by one horizontal scanning line from each other.

With such a solid-state color imaging camera, the number of picture elements to be used in an image sensor can be reduced to a half or quarter of the number of the picture elements which were used in the image sensor of the conventional solid-state color imaging camera.

BRIEF DESCRIPTION OF THE DRAWINGS

FIGS. 10 and 11 respectively illustrate three- and two-sensor type solid-state imaging cameras according to this invention;

FIGS. 12A and 12B respectively show examples of a color filter for the red and blue image sensor shown in FIG. 11;

FIG. 13 shows the optical positioning between the green image sensor and the red and blue image sensor shown in FIG. 10 or 11;

DETAILED DESCRIPTION OF THE INVENTION

Now, this invention will be described in detail by way of various exemplary embodiments.

Figure 1:
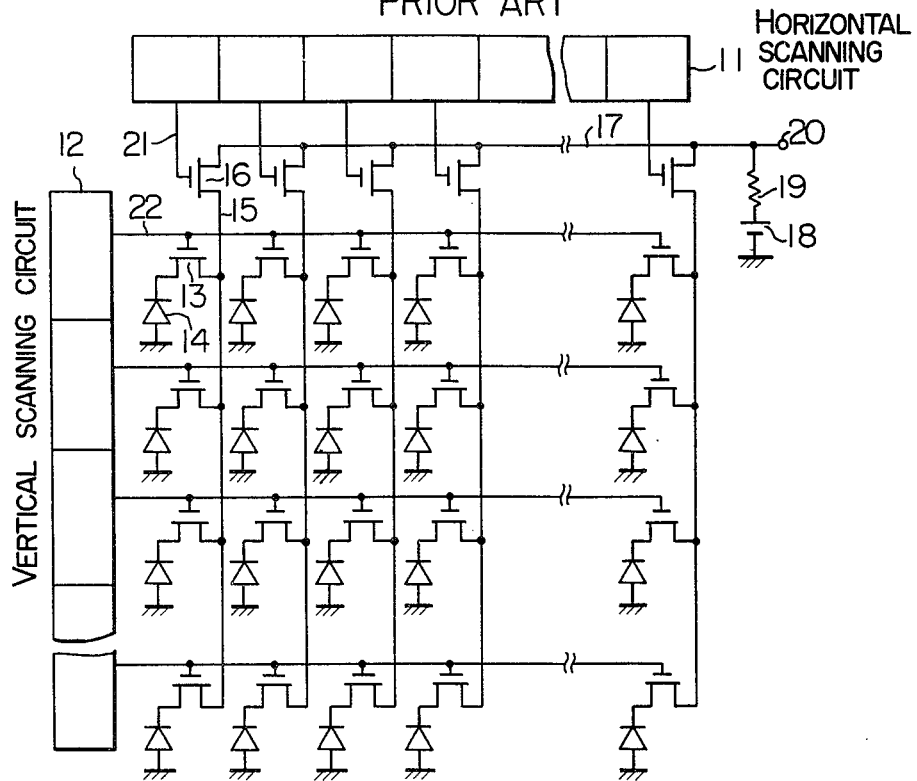
FIG. 1 schematically shows a structure of a solid-state image sensor.
Figure 2A:
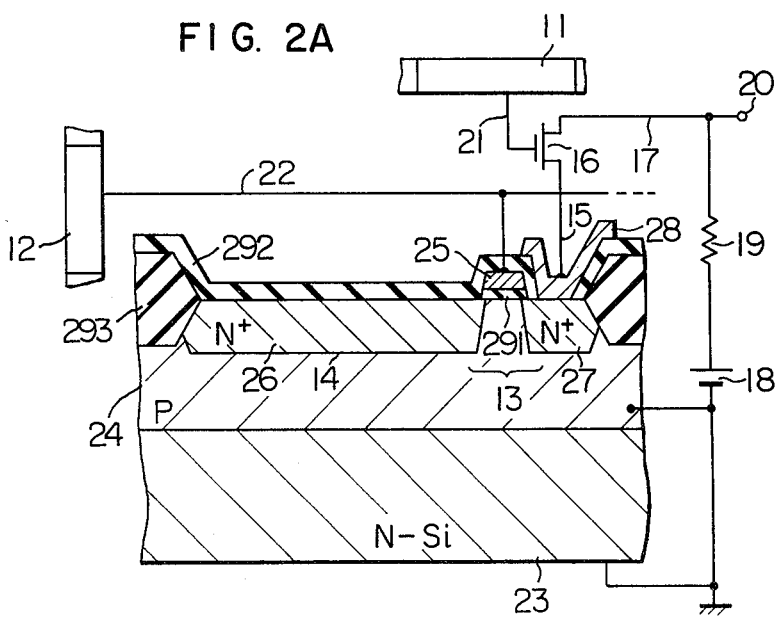
FIGS. 2A and 2B respectively show in cross section and in plan view the structure for one picture element and the picture element arrangement in a MOST type solid-state image sensor.
Figure 2B:
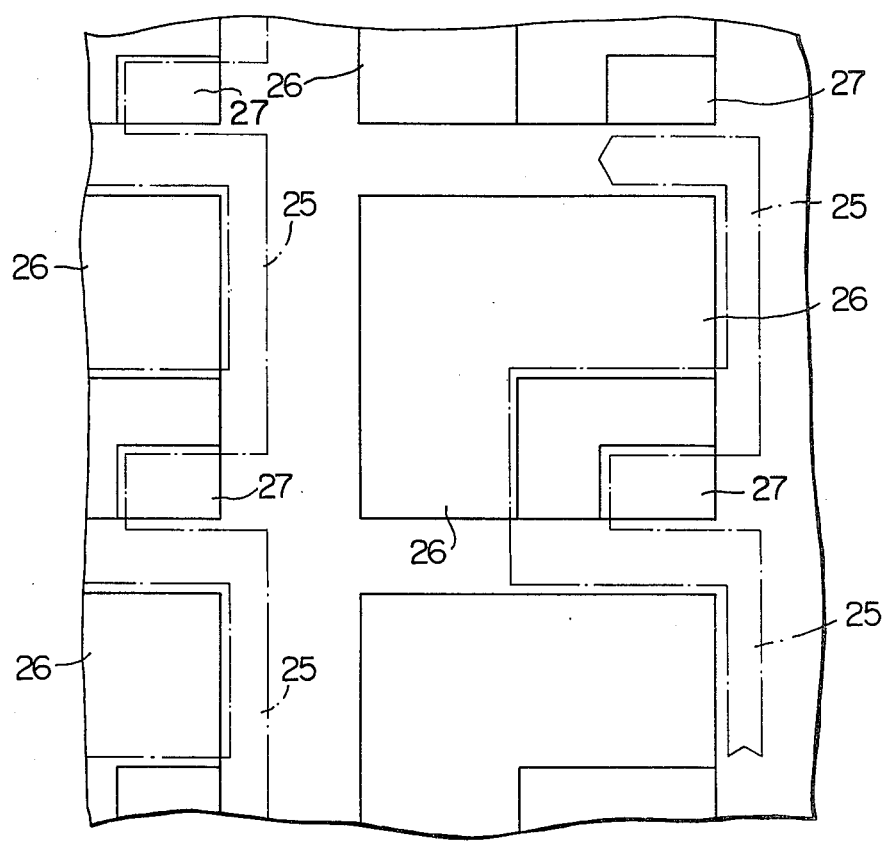
Figure 3:
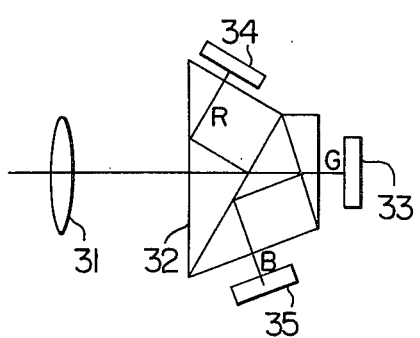
FIG. 3 schematically shows a structure of a three-sensor type solid-state imaging camera.
Figure 4:
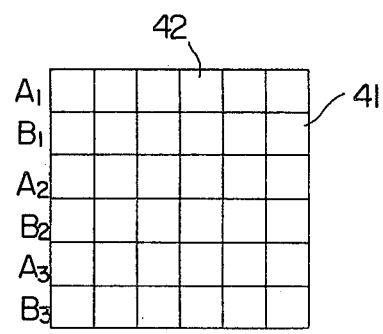
FIG. 4 schematically shows an image sensor having a 6×6 picture element matrix for explaining interlaced scanning employed in the conventional solid-state imaging camera.
Figure 5:
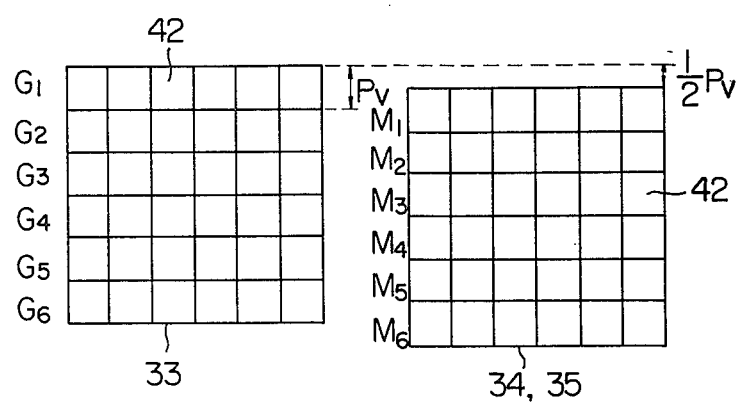
FIG. 5 shows the optical positioning of image sensors in a solid-state imaging camera according to one embodiment of this invention.

FIG. 5 shows the optical positioning of image sensors or imagers as one embodiment of this invention. In this embodiment, the G imager 33 for green light is shifted by half of the picture element pitch $P_V$ in the vertical direction with respect to the R and B imagers 34 and 35 for red and blue lights. The order of overlapping registration of the imagers may be arbitrary.

In a solid-state color imaging camera including the imagers shown in the embodiment of FIG. 5, pairs of rows $G_1$ and $M_1$, $G_2$ and $M_2$, . . . etc. (generally, the n+1 horizontal line of the G imager 33 and the n-th horizontal lines of the R and B imagers 34 and 35) are scanned in, for example, the odd-numbered field while other pairs of rows $G_2$ and $M_1$, $G_3$ and $M_2$, . . . etc. are scanned in the even-numbered field, namely, the scanning for G rows is shifted by one horizontal scanning line.

In the color TV system, resolution is determined depending on a luminance signal. The luminance signal includes red, green and blue signal components R, G and B. According to the NTSC format, the ratio of R+B to G equals 0.41:0.59. But, color balance is not greatly affected even if the ratio is made equal to 0.5:0.5. Thus, the solid-state color imaging camera employing the imager geometry shown in FIG. 5, the modified signal ratio 0.5:0.5 and the above-described scanning scheme, provides a series of luminance signals shifted by half of the picture element pitch in the vertical direction for the successive fields. This means that there can be provided an effect equivalent to the arrangement in which the number of picture elements in the vertical direction is doubled. Therefore, the vertical direction for one field can be covered with only about 250 picture elements even if the NTSC format is employed. Further, the scanning scheme employed in the described embodiment is equivalent in effect to the interlaced scanning employed for the TV scanning format. Thus, it will be understood that by using the optical positioning of the imagers employed in this embodiment, the number of picture elements in the vertical direction may be half the number of scanning lines used in the TV broadcasting system and also no after-image takes place.

Figure 6A:
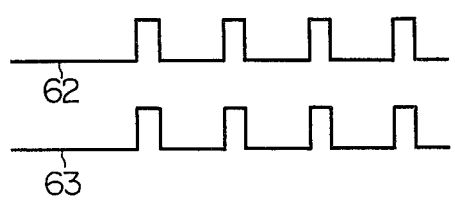
FIG. 6A is a pulse timing chart showing vertical scanning pulse trains employed for the first field of the embodiment shown in FIG. 5.
Figure 6B:
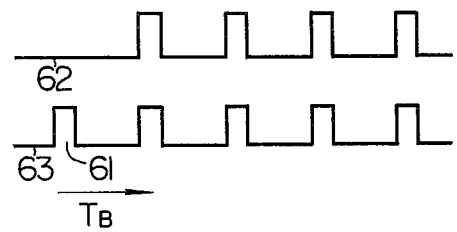
FIG. 6B is a pulse timing chart showing vertical scanning pulse trains employed for the second field in the embodiment shown in FIG. 5.

The switching of scanning from field to field can be easily carried out without using any special switching mechanism for the imagers themselves. For example, in the imager arrangement shown in FIG. 5, it is only necessary to add one pulse 61 into the vertical scanning pulses for the G imager 33 during the vertical flyback interval $T_B$ immediately before an even-numbered field, as seen from FIGS. 6A and 6B. FIG. 6A shows trains of vertical scanning pulses in the odd-numbered field while FIG. 6B shows trains of vertical scanning pulses in the even-numbered field. In those figures, reference numeral 62 designates a pulse train to be supplied to the imagers 34 and 35 and numeral 63 a pulse train to be supplied to the imager 33.

Figure 7:
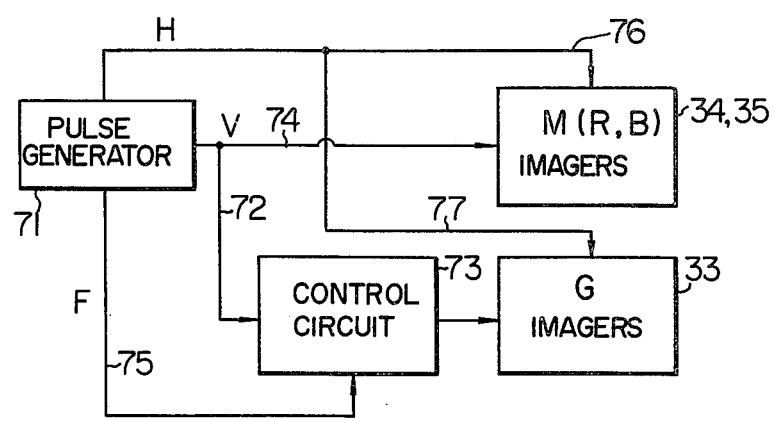
FIG. 7 shows in block diagram a system for driving the image sensors shown in FIG. 5.

FIG. 7 shows in block diagram a circuit system for driving the imagers of FIG. 5 (or for controlling the scanning circuits for the imagers). A synchronous driving pulse generator 71 supplies vertical driving pulses V on control lines 72 and 74 connected with respective vertical scanning circuits of the G imager 33 and the M (R and B) imagers 34, 35, horizontal driving pulses H on control lines 77 and 76 connected with respective horizontal scanning circuits of the G, R and B imagers 33, 34 and 35, and a field switching pulse signal F on a line 75. A driving control circuit 73 is inserted in the vertical scanning circuit control line 72 for the G imager 33. The control circuit 73 receives the field switching pulse signal F to provide the above-mentioned pulse 61 in the vertical flyback interval $T_B$. In place of the driving control circuit 73, a delay circuit which produces a delay of one horizontal scanning period and has a gating circuit for changing over between direct coupling and delayed coupling in response to the field switching signal F, may be inserted in the vertical scanning circuit control line 74 for the R and B imagers 34 and 35.

Figure 8:
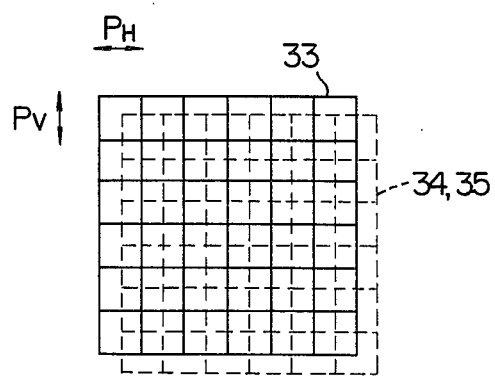
FIG. 8 schematically shows the optical positioning of image sensors in a solid-state imaging camera according to another embodiment of this invention.
Figure 9:
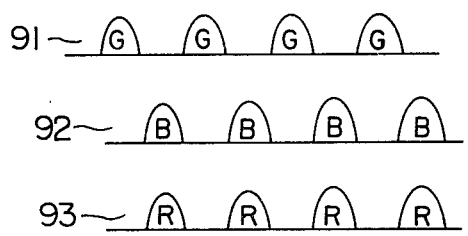
FIG. 9 is a schematic pulse timing chart illustrating the picture signals obtained from the image sensors shown in in FIG. 8.

FIG. 8 shows another embodiment of this invention, in which the optical positioning of the imager 34 is shifted by half of the picture element pitch $P_V$ in the vertical direction as in the previous embodiment and also by half of the picture element pitch $P_H$ in the horizontal direction, with respect to the imagers 34 and 35. In this case, video signals 91, 92 and 93 should be shifted in time by a period equivalent to half one picture element from the G, B and R imagers 33, 35 and 34, as shown in FIG. 9. For that purpose, horizontal scanning pulses for the R and B imagers 34 and 35 by 180° may be delayed with respect to horizontal scanning pulses for the G imager 33 or the same horizontal scanning pulses may be used for the imagers 33, 34 and 35 while passing the output signals of the imagers 34 and 35 through a delay circuit which provides a delay time equivalent to half one picture element.

In a solid-state color imaging camera employing the embodiment shown in FIG. 8, the luminance signal of the G imager 33 is interpolated by the luminance signals of the R and B imagers 34 and 35. Since resolution depends on the luminance signal, the resultant horizontal resolution can be almost doubled as compared with the horizontal resolution achieved by each imager. In other words, the number of picture elements in each of the horizontal and vertical directions in this embodiment can be halved as compared with that in the case of the conventional imager arrangement and therefore the total number of picture elements in the horizontal and vertical directions can be reduced to a quarter. Moreover, a color signal adapted for the TV system can be obtained without requiring any interlacing mechanism for the imagers. Though this idea of improving the horizontal resolution is already known, the practical effect of the idea is greatly enjoyed in a camera employing this invention in which the number of picture elements in the vertical direction can be halved in which direction the arrangement of numerous picture elements was difficult.

The imagers in the embodiments of FIGS. 5 and 8 may be used in combination with an optical system shown in FIG. 10 or 11, to receive their proper light components.

FIG. 10 shows a three-sensor type imaging camera using separate imagers $V_G$, $V_R$ and $V_B$ for three primary colors, i.e. green (G), red (R) and blue (B). In the figure, reference numeral 101 designates an objective lens, numerals 102 and 103 total-reflection mirrors, numeral 104 a red light reflecting mirror, and numeral 105 a blue light reflecting mirror.

FIG. 11 shows a two-sensor type imaging camera using an imager $V_G$ for green light and a double-purpose imager $V_{RB}$ for both red and blue lights. Reference numeral 111 designates an objective lens, and numeral 112 a mirror for reflecting red and blue lights. The imager $V_{RB}$ is attached with a mosaic-like filter having red and blue filter elements disposed corresponding to picture elements, as shown in FIG. 12A or 12B, and red and blue signals are separated by a signal processing circuit.

As shown in FIG. 13, the optical positioning of the imager $V_G$ for green light (indicated by 131) is shifted by half of the picture element pitch in the vertical direction with respect to the imager $V_{RB}$ for red and blue lights indicated by 132 (the imagers $V_R$ and $V_B$ in the case of three-sensor type camera). In FIG. 13, such a shifting is made also in the horizontal direction.

Referring to FIG. 13, $L_1$, $L_2$ and $L_3$ are horizontal scanning lines of the imager 131 while $H_1$, $H_2$ and $H_3$ are horizontal scanning lines of the imager 132. The interlaced scanning is, for example, such that lines $L_1$ and $H_1$, $L_2$ and $H_2$, $L_3$ and $H_3$ ... etc. (generally, the n-th horizontal line of the imager 131 and the n-th horizontal line of the imager 132) are selected in the first field while lines $L_1$ and $H_2$, $L_2$ and $H_3$ ... etc. (generally, the n-th horizontal line of the imager 131 and the (n+1)th horizontal line of the imager 132) are selected in the second or even numbered field.

In this case, since the scanning for the first field is shifted by one horizontal line from that for the second field, a hunting phenomenon appears on the reproduced image to degrade the picture quality. However, since the luminance signal in the TV system is generally given by the formula $E_Y = 0.3 E_R + 0.59 E_G + 0.11 E_B$, the degration of picture quality can be diminished if the G signal having large energy is fixed while the hunting phenomena occurs in the R and B signals having small energy.

Figure 14:
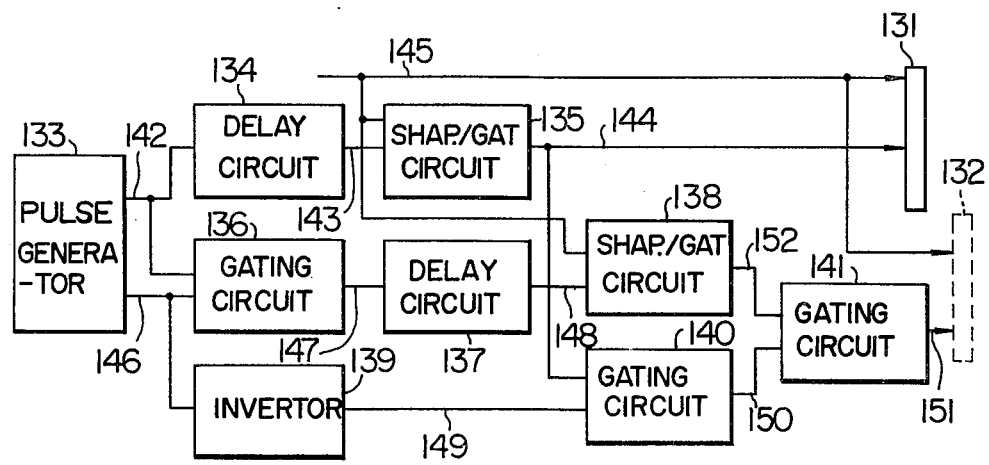
FIG. 14 shows in block diagram a system for driving the two-sensor type solid-state imaging camera shown in FIG. 11.
Figure 15:
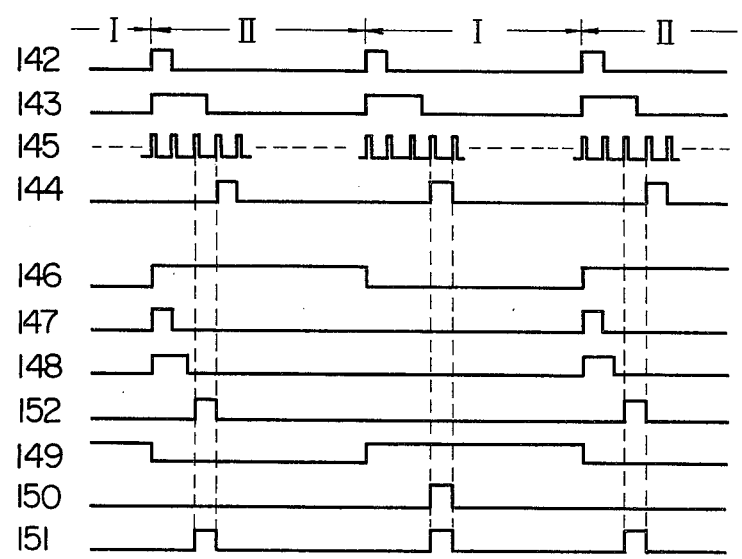
FIG. 15 is a pulse timing chart for illustrating the signal waveforms appearing at several points in the driving system shown in FIG. 14.

FIG. 14 shows a system for driving the two-sensor type or three-sensor type imaging camera shown in FIG. 11 or 10. FIG. 15 shows the signal waveforms appearing at various points in the driving system shown in FIG. 14.

Vertical driving pulses 142 generated by a synchronous driving pulse generator 133 for interlacing are supplied to a delay circuit 134. Delayed pulses 143 from the delay circuit 134 and clock pulses 145 for the respective vertical scanning circuits of the imagers 131 and 132 are supplied to a pulse shaping and gating circuit 135 which in turn delivers starting pulses 144 for the vertical scanning circuit for driving the imager 131 for green light.

Starting pulses 151 for the vertical scanning circuit for driving the imager 132 for red and blue lights are obtained as follows.

The vertical driving pulses 142 generated by the pulse generator 133 and field pulses 146 generated by the same generator are supplied to a gating circuit 136 which in turn delivers a signal 147 which is present only during the period I of the first field but is absent in the second field period II. This signal 147 is supplied to a delay circuit 137 to produce delayed pulses 148. The delayed pulse 148 and the vertical clock pulse 145 are sent to a pulse shaping and gating circuit 138 which in turn delivers a vertical start pulse 152 which is present only in the second field II and leads by one vertical clock pulse duration as compared to the vertical starting pulse 144 for the imager 131 for green light. The field pulse 146 generated by the pulse generator 133 is inverted in polarity by an inverter 139 which in turn delivers a field pulse 149. The field pulse 149 and the vertical starting pulse 144 for the imager 131 for green light are sent to a gating circuit 140 which in turn delivers a pulse 150 which is present only in the first field period I and is in phase with the vertical starting pulse 144. The pulse 150 and the pulse 152 are sent to a gating circuit 141. The output of the gating circuit 141 provides vertical starting pulses 151 for the vertical scanning circuit for driving the imager 132 for red and blue lights.

The interlaced scanning of the imagers 131 and 132 is performed by the combination of the vertical starting pulses 144 and 151, the pulses 144 being in phase with each other in the first and second fields and the pulses 151 being shifted by one vertical clock pulse duration from each other in the first and second fields.

In the system shown in FIG. 14, the clock pulses 145 for the vertical scanning circuits are sent in common to both the imagers, but the imagers may be driven respectively by different clock pulses. The signals 144 and 151 are produced on the basis of the vertical driving pulse 142 in the above embodiment, but they may be produced on the basis of another pulse similar to the pulse 142. Further, the vertical starting pulse for the imager 132 may be such that it is in phase with the pulse 144 in the second field period II and leads the pulse 144 in the first field period I.

As described above, according to this invention, the number of picture elements to be used in an image sensor can be reduced to a half or a quarter of that in the conventional image sensor, the image sensor can dispense with an interlaced scanning mechanism, and then the size and cost of the image sensor can be reduced, thereby realizing a small, light and inexpensive solid-state color imaging camera.

The two- or three-sensor type solid-state color imaging camera processing three light components of red, green and blue has been described in the above embodiments but any other constitution may be employed which is to treat light components complementary to red, green and blue or other different components.

Further, the idea of this invention can be embodied in not only color cameras but also monochromatic cameras. For example, if two imagers are overlapped such that one is shifted by a half of the picture element pitch from the other in the vertical direction or in both the vertical and horizontal directions and a similar signal processing scheme is used (the two imagers in this case deliver luminance signals alone and have the same weights), a small and inexpensive solid-state imaging camera having high resolution and adapted for TV broadcasting can be realized with smaller-scale solid-state imagers.

What is claimed is:

1. A solid-state color imaging camera comprising at least two solid-state image sensors each of which includes a two-dimensional array of picture elements arranged in lines and columns with respective predetermined pitches in vertical and horizontal directions, the optical position of the picture elements of one of said image sensors being shifted with respect to the picture elements of the other image sensor by half of the picture element pitch in the vertical direction, and means for shifting the horizontal scannings in odd-numbered fields and the horizontal scannings in even-numbered fields for one of said image sensors in timing by one horizontal scanning line from the other image sensor.

2. A solid-state color imaging camera as claimed in claim 1, including means for reading out the n-th horizontal line of said one image sensor and the n-th horizontal line of said other image sensor in the same timing in odd-numbered fields while reading out the (n+1)th horizontal line of said one image sensor and the n-th horizontal line of said other image sensor in the same timing in even-numbered fields.

3. A solid-state color imaging camera as claimed in claim 1, including means for reading out the n-th horizontal line of said one image sensor and the n-th horizontal line of said other image sensor in the same timing in the odd-numbered fields while reading out the n-th horizontal line of said one image sensor and the (n+1)th horizontal line of said other image sensor in the same timing in the even-numbered fields.

4. A solid-state color imaging camera as claimed in claim 1, wherein the optical position of said one image sensor with respect to said other image sensor is shifted by half of the picture element pitch in the horizontal direction.

5. A solid-state color imaging camera as claimed in claim 1, 2, 3 or 4, wherein there are three image sensors, said one of said image sensors being provided for green light and the other two of said image sensors being provided for red and blue lights.

6. A solid-state color imaging camera comprising at least two solid-state image sensors each including a two-dimensional array of picture elements arranged in lines and columns with respective pitches in vertical and horizontal directions, filter means for providing light of predetermined colors to said image sensors, and control circuit means for driving respective vertical scanning circuits for said image sensors, wherein the optical position of the picture elements of one of said image sensors is shifted with respect to the picture elements of the other image sensor by half of the picture element pitch in the vertical direction, and said control circuit means includes means for supplying first driving pulses to the vertical scanning circuit for said one image sensor so that scanning for every field is started at a predetermined horizontal line and second driving pulses to the vertical scanning circuit for said other image sensor so that scanning for every other field is started at a position shifted by one horizontal line from said predetermined horizontal line for said one image sensor.

7. A solid-state color imaging camera as claimed in claims 1, 2, 3 or 4, wherein said one of said image sensors is for green light and the other of said image sensors is for red and blue lights.

* * * * *